United States Patent
Wietelmann et al.

(10) Patent No.: US 11,145,910 B2
(45) Date of Patent: Oct. 12, 2021

(54) 1.5-3 V LITHIUM BATTERIES WITH OVERCHARGE PROTECTION

(71) Applicant: ALBEMARLE GERMANY GMBH, Frankfurt am Main (DE)

(72) Inventors: Ulrich Wietelmann, Friedrichsdorf (DE); Ute Emmel, Frankfurt am Main (DE); Irina Wolf, Malsch (DE); Margret Wohlfahrt-Mehrens, Illertissen-Tiefenbach (DE); Serife Kaymaksiz Tost, Salzgitter (DE); Florian Wilhelm, Holzheim (DE); Mario Wachtler, Strängnäs (SE)

(73) Assignee: Albemarle Germany GmbH, Frankfurt am Main (DE)

( * ) Notice: Subject to any disclaimer, the term of this patent is extended or adjusted under 35 U.S.C. 154(b) by 98 days.

(21) Appl. No.: 16/656,626

(22) Filed: Oct. 18, 2019

(65) Prior Publication Data

US 2020/0052347 A1    Feb. 13, 2020

Related U.S. Application Data

(63) Continuation of application No. 14/396,839, filed as application No. PCT/EP2013/058473 on Apr. 24, 2013, now abandoned.

(30) Foreign Application Priority Data

Apr. 26, 2012 (DE) .................... 10 2012 008 178.2

(51) Int. Cl.
*H01M 10/42* (2006.01)
*H01M 4/38* (2006.01)
(Continued)

(52) U.S. Cl.
CPC ......... *H01M 10/4235* (2013.01); *H01M 4/38* (2013.01); *H01M 4/382* (2013.01);
(Continued)

(58) Field of Classification Search
CPC ........ H01M 4/38; H01M 4/382; H01M 4/405; H01M 4/483; H01M 4/502; H01M 4/582;
(Continued)

(56) References Cited

U.S. PATENT DOCUMENTS 4,284,692 A    8/1981  Rao et al.
7,172,834 B1   2/2007  Jow et al.
(Continued)

FOREIGN PATENT DOCUMENTS

CN    101604578 A    12/2009
JP    2007518230 A    7/2007
(Continued)

OTHER PUBLICATIONS

Rao et al., Effect of Sulfur Impurities on Li/TiS$_2$ Cells, 1981, Journal of The Electrochemical Society, 128, 942-944 (Year: 1981).*
(Continued)

*Primary Examiner* — Sean P Cullen
(74) *Attorney, Agent, or Firm* — Marcy M. Hoefling; Troy S. Kleckley; Nathan C. Dunn

(57) ABSTRACT

Rechargeable, non-aqueous lithium batteries which contain, as active anode material, either lithium metal or a lithium alloy, an active cathode material with a redox potential in the range of between 1.5 and 3.4 V vs Li/Li$^+$ and lithium rhodanide (LiSCN) as electrolyte component. One or more related methods for providing overcharge protection are also described herein.

15 Claims, 1 Drawing Sheet

(51) Int. Cl.
     H01M 4/40       (2006.01)
     H01M 10/0567    (2010.01)
     H01M 10/0569    (2010.01)
     H01M 10/052     (2010.01)
     H01M 4/48       (2010.01)
     H01M 4/50       (2010.01)
     H01M 4/58       (2010.01)
     H01M 10/0525    (2010.01)
     H01M 10/0568    (2010.01)
     H01M 4/505      (2010.01)
     H01M 4/587      (2010.01)
     H01M 10/0565    (2010.01)

(52) U.S. Cl.
     CPC ........... *H01M 4/405* (2013.01); *H01M 4/483* (2013.01); *H01M 4/502* (2013.01); *H01M 4/582* (2013.01); *H01M 10/052* (2013.01); *H01M 10/0525* (2013.01); *H01M 10/0567* (2013.01); *H01M 10/0568* (2013.01); *H01M 10/0569* (2013.01); *H01M 4/505* (2013.01); *H01M 4/58* (2013.01); *H01M 4/587* (2013.01); *H01M 10/0565* (2013.01); *H01M 2300/0028* (2013.01); *H01M 2300/0034* (2013.01); *H01M 2300/0082* (2013.01); *H01M 2300/0085* (2013.01); *H01M 2300/0091* (2013.01)

(58) Field of Classification Search
     CPC ........... H01M 10/4235; H01M 10/052; H01M 10/0525; H01M 10/0567; H01M 10/0568; H01M 10/0569
     USPC ........ 429/337, 188, 199, 200, 339, 341, 343
     See application file for complete search history.

(56) References Cited

U.S. PATENT DOCUMENTS

| | | |
|---|---|---|
| 2002/0114993 A1 | 8/2002 | Miyaki et al. |
| 2005/0147886 A1 | 7/2005 | Mikhaylik |
| 2005/0147891 A1 | 7/2005 | Mikhaylik |
| 2007/0065728 A1 | 3/2007 | Zhang et al. |
| 2007/0111101 A1 | 5/2007 | Ohkubo et al. |
| 2011/0123870 A1 | 5/2011 | Oh et al. |
| 2012/0242292 A1 | 9/2012 | Ogino |
| 2013/0298386 A1 | 11/2013 | Tarascon et al. |

FOREIGN PATENT DOCUMENTS

| | | |
|---|---|---|
| JP | 2011044245 A | 3/2011 |
| WO | 0036683 A2 | 6/2000 |
| WO | 2011157958 A1 | 12/2011 |

OTHER PUBLICATIONS

Kim et al.; "The Surface Morphology of Li Metal Electrode"; Metals and Materials, vol. 6, No. 4; 2000; pp. 345-349.

Rao et al.; "The Li/TiS2 Cell With LiSCN Electrolyte"; Journal of Applied Electrochemistry; 10; 1980; pp. 757-763.

Xu, K.; "Electrolytes Overview" in Encyclopedia of Electrochemical Power Sources; K. Garche (ed.); vol. 5; Elsevier, Amsterdam; 2009; pp. 51-70.

* cited by examiner

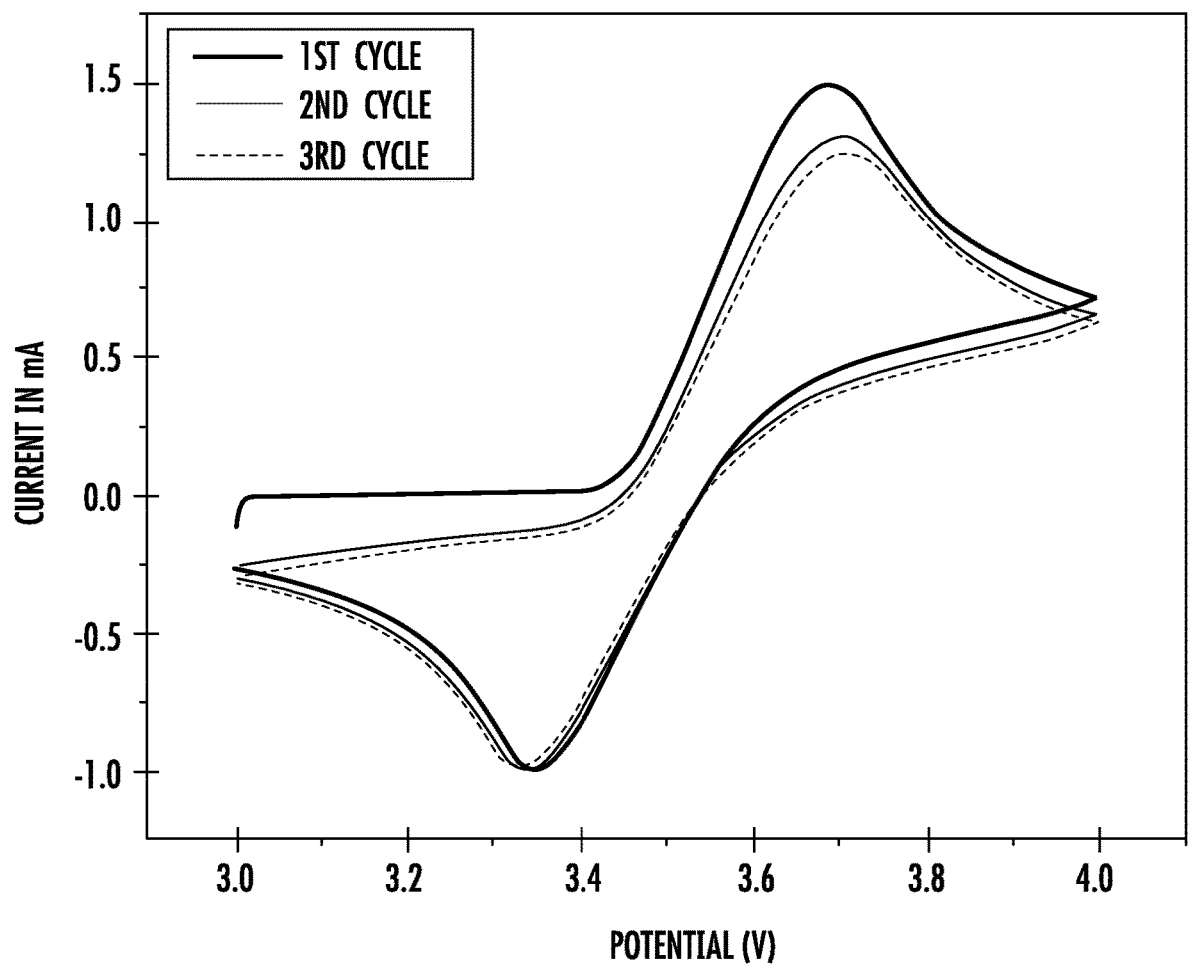

1.5-3 V LITHIUM BATTERIES WITH OVERCHARGE PROTECTION

CROSS REFERENCE TO RELATED APPLICATIONS

This is a continuation of U.S. application Ser. No. 14/396,839, filed Jan. 14, 2015, which is a 371 of International Application No. PCT/EP2013/058473, filed Apr. 24, 2013, and claims priority from German Patent Application No. 10 2012 008 178.2 filed Apr. 26, 2012. Each patent application identified above is incorporated here by reference in its entirety to provide continuity of the disclosure.

TECHNICAL FIELD

The present disclosure relates to batteries and related methods, and more specifically to lithium batteries and related methods for overcharge protection.

BACKGROUND

Lithium ion batteries (LiBs) are battery systems having the highest specific energy density at the present time. They consist of a combination of two lithium insertion materials which are capable of reversibly inserting and deinserting lithium ions at different potential levels. In general, the cathode (the positive terminal) consists of a lithium metal oxide, while the anode (the negative active terminal) contains a graphitic material. The anode reaction is then as follows:

$$Li^+ + e^- + 6C \leftrightarrow LiC_6$$

The theoretical capacitance of graphitic materials is given by the limiting stoichiometry of $LiC_6$, and is 372 mAh/g.

Anode materials having a higher capacitance are also known, first and foremost being lithium metal itself, which has a theoretical specific capacitance of 3,860 mAh/g. However, it is impossible to use lithium metal anodes in combinations with "traditional" lithium ion cathode materials (i.e., lithium metal oxides) because in this case both of the electrodes are already in the lithiated state. Therefore, if lithiated anode materials are to be used, in particular lithium metal itself, then non-lithiated (or partially lithiated) cathode materials must be used. Such materials include, for example, the following:

| Non-lithiated Cathode Materials | Oxidation potential vs. Li/Li+ (V) |
|---|---|
| $CF_x$ | 3.2 |
| Transition metal oxides, e.g.: | 1.5-3.4 |
| $MnO_2$ | 3 |
| $V_2O_5$ | 1.9-3.4 |
| $V_6O_{13}$ | 2-2.8 |
| CuO | 1.5 |
| Transition metal sulfides, e.g.: | 1-2.1 |
| $FeS_2$ | 1.5 |
| $MoS_2$ | 1-2 |
| $TiS_2$ | 2.1 |
| F-containing conversion cathode materials, e.g.: $BiF_3$, $Bi_2O_{3-x}F_{2x}$, FeOF, $FeF_3$, $FeF_2$, $CoF_3$, $CoF_2$, $TiF_3$, $VF_3$, $MnF_3$, $NiF_2$, $CrF_3$, $CuF_2$ | 2-3.5 |
| Organic cathode materials, e.g., tetraketopiperazines, polyanthraquinone sulfides, pyromellitic acid anhydride | 2-2.5 |
| S | 2.0-2.4 |
| Se | 2.1 |

When such materials are overcharged, irreversible structural changes may occur which may impair or completely destroy the functionality of the cathode material. In general, the Li insertion potential should not be exceeded by more than approximately 0.5-1.5 V. In addition, it is important to prevent the charging potential from being exceeded, because otherwise, electrolyte components, e.g., organic solvents, may be oxidized with release of energy. The carbonates that are typically used in lithium ion batteries are stable to approximately 4.4 V vs. $Li/Li^+$, but they are not very suitable for galvanic cells with lithium metal anodes or lithium alloy anodes. To be able to use metal anodes, reduction-stable solvents, usually ethers, are required. However, such solvents (dimethoxyethane, diethyl ether) are stable only to approximately 3.6 V (K. Xu, "Electrolytes: Overview" in *Encyclopedia of Electrochemical Power Sources*, J. Garche (ed.), Vol. 5, p. 51, Elsevier, Amsterdam 2009).

Such a restriction on the charging potential may be implemented electronically by a battery management system, which is relatively complex and may result in dangerous disturbances in the event of a malfunction. It is therefore desirable to have an inherent (chemical) protective system that prevents the desired final charging potential from being exceeded. Such a system is supplied by so-called redox shuttle compounds. Such compounds are oxidized when a certain charging potential is exceeded. The oxidized form is stable and can travel by migration or diffusion to the anode, where it can be discharged (reduced) to the initial form. The reduced species may then be oxidized again on the anode, etc.

No reversible redox shuttle compounds have yet been described for the aforementioned cathode materials.

SUMMARY

In general, the present disclosure provides a rechargeable nonqueous lithium battery and related methods.

In an aspect, a rechargeable non-aqueous lithium battery is provided characterized in that it contains either lithium metal or a lithium alloy as active anode material, and contains an active cathode material having a redox potential in the range between 1.5 and 3.4 V vs. $Li/Li^+$ and lithium rhodanide (LiSCN) as an electrolyte component.

One or more aspects include the rechargeable non-aqueous lithium battery of the preceding paragraph characterized in that powdered lithium metal or a powdered lithium alloy which may be present in a compacted farm is included as the active anode material.

One or more aspects include the rechargeable non-aqueous lithium battery of any preceding paragraph characterized in that the cathode material is selected from the group composed of $CF_x$, transition metal oxides, transition metal sulfides, transition metal fluorides, transition metal oxyfluorides, organic redox-active compounds as well as sulfur and/or selenium.

One or more aspects include the rechargeable non-aqueous lithium battery of the preceding paragraph characterized in that the cathode material is selected from $CF_x$, $MnO_2$, $V_2O_5$, $V_5O_{13}$, FeOF, $FeF_3$, $FeF_2$, S.

One or more aspects include the rechargeable non-aqueous lithium battery of any preceding paragraph characterized in that the electrolyte is in a liquid, gelatinous or solid state at room temperature.

One or more aspects include the rechargeable non-aqueous lithium battery of the preceding paragraph characterized in that the electrolyte contains organic aprotic solvents selected from the group composed of cyclic or acyclic ethers, polyethers, nitriles, lactones, carbonic acid esters and/or ionic liquids.

One or more aspects include the rechargeable non-aqueous lithium battery of the preceding paragraph characterized in that the electrolyte contains at least one organic aprotic solvent selected from the group composed of tetrahydropyran, tetrahydrofuran, 1,2-dimethoxyethane, diethylene glycol dimethyl ether, acetonitrile, adiponitrile, malodinitrile, glutaronitrile, y-butyrolactone and imidazolium salts.

One or more aspects include the rechargeable non-aqueous lithium battery of any preceding paragraph characterized in that the electrolyte contains LiSCN and at least one additional conductive salt.

One or more aspects include the rechargeable non-aqueous lithium battery of any preceding paragraph characterized in that the additional conductive salt is selected from the group composed of $LiPF_6$, lithium fluoroalkyl phosphates, $LiBF_4$, imide salts, $LiOSO_2CF_3$, methide salts, $LiClO_4$, lithium chelatoborates, lithium fluorochelatoborates, lithium chelatophosphates, lithium fluorochelatophosphates and/or lithium halides.

One or more aspects include the rechargeable non-aqueous lithium battery of any preceding paragraph characterized in that the electrolyte contains organic polymers selected from the group composed of polyethylene oxide, polyacrylonitrile, polyvinylidene fluoride or any mixtures thereof.

One or more aspects include the rechargeable non-aqueous lithium battery of any preceding paragraph characterized in that the LiSCN is present in the electrolyte in a concentration of 0.01 to 15 wt %.

One or more aspects include the rechargeable non-aqueous lithium battery of the preceding paragraph characterized in that the LiSCN is present in the electrolyte in a concentration of 1 to 10 wt %.

In another aspect, an electrolyte for use in the rechargeable non-aqueous lithium battery of any preceding paragraph is provided characterized in that lithium rhodanide is present as the electrolyte component.

One or more aspects include the electrolyte of the proceeding paragraph characterized in that the LiSCN is present in the electrolyte in a concentration of 0.01 to 15 wt %.

In another aspect, a method of use of LiSCN as a redox shuttle compound in electrolytes of any of the rechargeable non-aqueous lithium batteries of any preceding paragraph is provided.

BRIEF DESCRIPTION OF DRAWING

The FIGURE shows a cyclovoltagram of an electrolyte with 0.1 M LiSCN in 1M $LiPF_6$/EC:DMC (1:1 by weight) and a Pt electrode, recorded with a rate of advance of 100 mV/s in the scanning range of 3.0-4.0 V vs. $Li/Li^+$.

DESCRIPTION

The object of the present invention is to provide a rechargeable non-aqueous lithium battery which contains a reversible redox shuttle compound and oxidizes reversibly at approximately 0.5-1.5 V above the charging potential of lithium-free cathode materials and below the start of decomposition of ethereal solvents (approximately 3.6 V).

This object is achieved according to the invention by a rechargeable non-aqueous lithium battery, which contains either lithium metal or a lithium alloy as active anode material in the charged state, and an active cathode material having a redox potential in the range between 1.5 and 3.4 V vs. $Li/Li^+$ and lithium rhodanide (LiSCN) as an electrolyte component.

Powdered lithium metal or a powdered lithium alloy is preferably present as the active anode material. These anodes produced from powdered particles may be present in a mechanically compacted form by pressing, rolling or the like, or may be compressed by sintering, to obtain a structure that is macroscopically similar to sheet metal. However, the compacted powder anode is characterized by a composite structure; i.e., the phase boundaries of the powdered primary particles are discernible by high resolution imaging methods (scanning electron microscopy, for example). The use of powdered anode layers or anode layers derived from powders has the advantage that the specific current load (i.e., relative to a unit surface area) is reduced in comparison to a homogeneous sheet metal anode, resulting in reduced dendrite growth (see, for example, S. W. Kim, *Metals and Materials*, 6 (2000), 345-349).

Binary lithium secondary metal compounds are used as the lithium alloy, in which the secondary metal is preferably selected from the group composed of Si, Sn, Al, Ab.

The cathode material is selected from the group composed of $CF_x$, transition metal oxides, transition metal sulfides, transition metal fluorides, transition metal oxyfluorides, organic redox-active compounds as well as sulfur and/or selenium.

The cathode material is preferably selected from $CF_x$, $MnO_2$, $V_2O_5$, $V_6O_{13}$, FeOF, $FeF_3$, $FeF_2$, S.

The electrolyte in the rechargeable non-aqueous lithium battery is preferably in a liquid, gelatinous or solid state at room temperature. The rechargeable non-aqueous lithium battery preferably contains as an electrolyte an organic aprotic solvent selected from the group composed of cyclic or acyclic ethers, polyethers, nitriles, lactones, carbonic acid esters and/or ionic liquids.

The electrolyte preferably contains at least one organic aprotic solvent selected from the group composed of tetrahydropyran, tetrahydrofuran, 1,2-dimethoxyethane, diethylene glycol dimethyl ether, acetonitrile, adiponitrile, malodinitrile, glutaronitrile, y-butyrolactone and imidazolium salts.

The electrolyte of the rechargeable non-aqueous lithium battery may preferably contain LiSCN and at least one other conductive salt.

The additional conductive salt is preferably selected from the group composed of $LiPF_6$, lithium fluoroalkyl phosphates, $LiBF_4$, imide salts, $LiOSO_2CF_3$, methide salts, $LiClO_4$, lithium chelatoborates, lithium fluorochelatoborates, lithium chelatophosphates, lithium fluorochelatophosphates and/or lithium halides.

The electrolyte of the rechargeable non-aqueous lithium battery may contain organic polymers selected from the group composed of polyethylene oxide, polyacrylonitrile, polyvinylidene fluoride or any mixtures thereof.

The LiSCN is present in the electrolyte in the rechargeable non-aqueous lithium battery in a concentration of 0.01 to 15 wt %.

The LiSCN is preferably present in the electrolyte in a concentration of 1 to 10 wt %.

The invention also relates to an electrolyte for use in rechargeable non-aqueous lithium batteries, in which lithium rhodanide is contained as an electrolyte component.

The LiSCN is preferably present in the electrolyte in a concentration of 0.01 to 15 wt %.

The invention relates in particular to the use of LiSCN as a redox shuttle compound in electrolytes of rechargeable non-aqueous lithium batteries.

It has been discovered that LiSCN oxidizes when a potential of approximately 3.4 V vs. Li/Li$^+$ is exceeded, and is reduced in the subsequent reductive branch. Surprisingly, this reaction is reversible: three cycles which illustrate this are shown in the FIGURE. The special advantage of LiSCN is that the LiSCN itself is a strongly dissociating lithium salt and therefore can be used as an Li electrolyte. It is therefore not necessary in principle to use another lithium salt having a conductive salt function in addition to LiSCN.

The electrolyte may be present in liquid, gelatinous or solid farm. In addition to lithium rhodanide, the electrolyte may contain organic aprotic solvents, for example carbonic acid esters (dimethyl carbonate, diethyl carbonate, ethylmethyl carbonate, propylene carbonate, ethylene carbonate), cyclic or acyclic ethers (dibutyl ether, tetrahydropyran or tetrahydrofuran), polyethers (1,2-dimethoxyethane or diethylene glycol dimethyl ether), as well as nitriles (acetonitrile, adiponitrile, malodinitrile, glutaronitrile) and lactones (γ-butyrolactone), ionic liquids (e.g., imidazolium salts), additional lithium salts (e.g., LiPF$_6$, lithium fluoroalkyl phosphates, LiBF$_4$), imide salts (e.g., LiN(SO$_2$CF$_3$)$_2$), LiOSO$_2$CF$_3$, methide salts (e.g., LiC(SO$_2$CF$_3$)$_3$), LiClO$_4$, lithium chelatoborates (e.g., LiBOB), lithium fluorochelatoborates (e.g., LiC$_2$O$_4$BF$_2$), lithium chelatophosphates (e.g., LiTOP) and lithium fluorochelatophosphates (e.g., Li(C$_2$O$_4$)$_2$PF$_2$), lithium halides (LiCl, LiBr, LiI), additives (e.g., vinylene carbonate) and/or polar polymers (e.g., polyethylene oxide, polyacrylonitrile, polyvinylidene fluoride) in any mixture.

The LiSCN is present in the electrolyte in a concentration of 0.01 to 15%, particularly preferably 1 to 10%.

What is claimed is:

1. A method for providing overcharge protection to a rechargeabe and non-aqueous lithium battery, the method comprising:
   providing the rechargeabe and non-aqueous lithium battery comprising an anode comprising active anode material, a cathode comprising an active cathode material having a redox potential in a range from about 1.5 and 3.4 V vs. Li/Li$^+$, and an electrolyte comprising at east one additional conductive salt and a redox shuttle compound present in the electrolyte in a concentration in a range from 0.01 to 15 wt. %,
   wherein the redox shuttle is lithium rhodanide (LiSCN),
   wherein the at least one additional conductive salt is selected from the group consisting of LiPF$_6$, a lithium fluoroalkyl phosphate, LiBF$_4$, LiOSO$_2$CF$_3$, a methide salt, LiClO$_4$, a lithium chelatoborate, a lithium fluorochelatoborate, a lithium chelatophosphate, a lithium fluorochelatophosphate and a lithium halide;
   charging the rechargeabe and non-aqueous lithium battery at a charging voltage greater than the redox potential of the active cathode material,
   wherein the charging voltage is about 0.5 to 1.5 V above the redox potential of the active cathode material.

2. The method of claim 1 wherein the rechargeable and non-aqueous lithium battery is not used with a battery management system during charging.

3. The method of claim 1, wherein the active anode material is selected from the group consisting of lithium metal and a lithium alloy.

4. The method of claim 1, wherein the active anode material is a powder and present in a compacted form as the active anode material.

5. The method of claim 1, wherein the active cathode material is selected from the group consisting of CF$_x$, MnO$_2$, V$_2$O$_5$, V$_6$O$_{13}$, FeOF, FeF$_3$, S, and FeF$_2$.

6. The method of claim 1, wherein the electrolyte is in a liquid, gelatinous or solid state at room temperature.

7. The method of claim 1, wherein the electrolyte comprises organic aprotic solvents selected from the group consisting of a cyclic ether, an acyclic ether, a polyether, a nitrile, a lactone, a carbonic acid ester and an ionic liquid.

8. The method of claim 1, wherein the electrolyte comprises at least one organic aprotic solvent selected from the group consisting of tetrahydropyran, tetrahydrofuran, 1,2-dimethoxyethane, diethylene glycol dimethyl ether, acetonitrile, adiponitrile, malodinitrile, glutaronitrile, γ-butyrolactone and an imidazolium salt.

9. The method of claim 1, wherein the electrolyte further comprises at least one organic polymer selected from the group consisting of polyethylene oxide, polyacrylonitrile, polyvinylidene fluoride, and any combination of two or more of the foregoing.

10. The method of claim 1 further comprising:
    oxidizing the redox shuttle compound to form an oxidized redox shuttle compound;
    diffusing the oxidized redox shuttle compound to the anode; and
    discharging the oxidized redox shuttle compound to form the redox shuttle compound.

11. The method of claim 1, wherein the redox shuttle compound is present in the electrolyte in a concentration in the range of from 0.01 to 10 wt. %.

12. The method of claim 11, wherein the active cathode material is selected from the group consisting of CF$_x$, a transition metal oxide, a transition metal sulfide, a transition metal fluoride, a transition metal oxyfluoride, an organic redox-active compound, sulfur, and selenium.

13. A method for providing overcharge protection to a rechargeabe and non-aqueous lithium battery, the method comprising:
    providing the rechargeabe and non-aqueous lithium battery comprising an anode comprising active anode material, a cathode comprising an active cathode material having a redox potential in a range from about 1.5 and 3.4 V vs. Li/Li$^+$, and an electrolyte comprising at least one additional conductive salt and a redox shuttle compound present in the electrolyte in a concentration in a range from 0.01 to 15 wt. %,
    wherein the redox shuttle is lithium rhodanide (LiSCN), and
    the active cathode material is selected from the group consisting of CF$_x$, MnO$_2$, V$_2$O$_5$V$_6$O$_{13}$, FeOF, FeF$_3$, S, and FeF$_2$,
    wherein the at last one additional conductive salt is selected from the group consisting of LiPF$_6$, a lithium fluoroalkyl phosphate, LiBF$_4$, LiOSO$_2$CF$_3$, a methide salt, LiClO$_4$, a lithium chelatoborate, a lithium fluorochelatoborate, a lithium chelatophosphate, a lithium fluorochelatophosphate and a lithium halide; and
    charging the rechargeabe and non-aqueous lithium battery at a charging voltage greater than the redox potential of the active cathode material,
    wherein the charging voltage is about 0.5 to 1.5 V above the redox potential of the active cathode material;
    oxidizing the redox shuttle compound to form an oxidized redox shuttle compound;
    diffusing the oxidized redox shuttle compound to the anode; and
    discharging the oxidized redox shuttle compound to form the redox shuttle compound.

14. The method of claim 13 wherein the rechargeable and non-aqueous lithium battery is not used with a battery management system during charging.

15. The method of claim 13, wherein the electrolyte further comprises at least one organic aprotic solvent selected from the group consisting of tetrahydropyran, tetrahydrofuran, 1,2-dimethoxyethane, diethylene glycol dimethyl ether, acetonitrile, adiponitrile, malodinitrile, glutaronitrile, y-butyrolactone and an imidazolium salt.

* * * * *